United States Patent [19]

Forsberg et al.

[11] Patent Number: 4,661,275

[45] Date of Patent: Apr. 28, 1987

[54] WATER-BASED FUNCTIONAL FLUID THICKENING COMBINATIONS OF SURFACTANTS AND HYDROCARBYL-SUBSTITUTED SUCCINIC ACID AND/OR ANHYDRIDE/AMINE TERMINATED POLY(OXYALKYLENE) REACTION PRODUCTS

[75] Inventors: John W. Forsberg, Mentor-on-the-Lake; Richard W. Jahnke, Mentor, both of Ohio

[73] Assignee: The Lubrizol Corporation, Wickliffe, Ohio

[21] Appl. No.: 760,185

[22] Filed: Jul. 29, 1985

[51] Int. Cl.$^4$ .......................................... C10M 173/02
[52] U.S. Cl. ................................ 252/49.3; 252/49.5; 252/51.5 A; 252/34.7
[58] Field of Search ................ 252/49.3, 49.5, 51.5 A, 252/75, 34.7

[56] References Cited

U.S. PATENT DOCUMENTS

| | | | |
|---|---|---|---|
| Re. 30,885 | 3/1982 | Rieder | 252/34 |
| Re. 31,522 | 2/1984 | Rieder | 252/34 |
| 2,674,619 | 4/1954 | Lundsted | 260/485 |
| 2,979,528 | 4/1961 | Lundsted | 260/584 |
| 3,005,776 | 10/1961 | Langer et al. | 252/77 |
| 3,021,232 | 2/1962 | Pretka | 117/138.8 |
| 3,057,890 | 10/1962 | Groote | 260/407 |
| 3,108,011 | 10/1963 | Frotscher | 117/62.5 |
| 3,216,941 | 11/1965 | Vries | 252/51.5 |
| 3,260,691 | 7/1966 | Lavin et al. | 260/30.2 |
| 3,344,083 | 9/1967 | Dickson et al. | 252/344 |
| 3,346,501 | 10/1967 | Boehmer | 252/73 |
| 3,374,171 | 3/1965 | Pitman | 252/34.7 |
| 3,412,111 | 11/1968 | Irwin et al. | 260/346.8 |
| 3,525,693 | 8/1970 | Lyle et al. | 252/34 |
| 3,748,276 | 7/1973 | Schmolka | 252/316 |
| 3,829,506 | 8/1974 | Schmolka et al. | 260/615 |
| 3,878,109 | 4/1975 | Ikeda et al. | 210/500 M |
| 3,920,612 | 11/1975 | Stephens | 260/47 CP |
| 4,025,452 | 5/1977 | Nnadi et al. | 252/51.5 A |
| 4,108,889 | 8/1978 | Connor | 260/502.4 R |
| 4,138,346 | 2/1979 | Nassry et al. | 252/32.5 |
| 4,151,099 | 4/1979 | Nassry et al. | 252/32.7 E |
| 4,234,435 | 11/1980 | Meinhardt et al. | 252/51.5 A |
| 4,239,635 | 12/1980 | Rieder | 252/49.3 |
| 4,257,902 | 3/1981 | Singer | 252/18 |
| 4,288,639 | 9/1981 | Camp | 568/625 |
| 4,374,741 | 2/1983 | Rieder | 252/34 |
| 4,379,063 | 4/1983 | Williams | 252/33.6 |
| 4,383,937 | 5/1983 | Williams | 252/389 R |
| 4,409,000 | 10/1983 | LeSuer | 44/70 |
| 4,419,252 | 12/1983 | Skim | 252/51.5 A |
| 4,440,902 | 4/1984 | Diery et al. | 252/404 |
| 4,444,566 | 4/1984 | Crawford | 44/72 |
| 4,448,703 | 5/1984 | Forsberg | 252/75 |

FOREIGN PATENT DOCUMENTS

| | | |
|---|---|---|
| 0004426 | 3/1979 | European Pat. Off. |
| 0020037 | 1/1980 | European Pat. Off. |
| 0074619 | 9/1981 | European Pat. Off. |
| 0024848 | 11/1981 | European Pat. Off. |
| 8112382 | 7/1979 | Japan |
| 8235580 | 8/1980 | Japan |

OTHER PUBLICATIONS

Redmond, J., "Preparation-Properties et Emplois de l'Anhydride Dodecenylsuccinique", *Revue Des Products Chemiques*, (1962).

Benn, F. R. and Dwyer, J., "The Ene Reaction of Maleic Anhydride with Alkenes", *J.C.S. Perkin*, (1977), pp. 533–535.

Jefferson Chemical Co., "Jeffamine Poly(oxyethylene) Diamines, Jeffamine ED Compounds", *Advance Technical Data*, (1978).

Texaco Chemical Co., "Jeffamine Poly(oxyethylene) Diamines, Jeffamine ED Compounds", *New Product Development*, (1981).

Texaco Chemical Co., "Use of Jeffamine Products in Fuel and Lubricant Applications", *New Product Development*, (1985).

*Primary Examiner*—Jacqueline V. Howard
*Attorney, Agent, or Firm*—Forrest L. Collins; Joseph P. Fischer; Denis A. Polyn

[57] ABSTRACT

A composition is disclosed which comprises (A) at least one water-dispersible reaction product made by reacting (A)(I) at least one compound represented by the formula

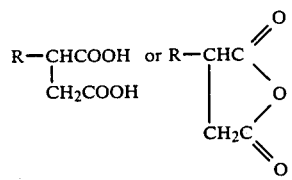

wherein R is a hydrocarbyl group of from about 8 to about 40 carbon atoms, with (A)(II) at least one water-dispersible amine terminated poly(oxyalkylene) and (B) at least one surfactant. Aqueous concentrates and water-based functional fluids comprising these compositions are also disclosed. These compositions are useful as shear-stable thickeners for such functional fluids.

55 Claims, No Drawings

WATER-BASED FUNCTIONAL FLUID THICKENING COMBINATIONS OF SURFACTANTS AND HYDROCARBYL-SUBSTITUTED SUCCINIC ACID AND/OR ANHYDRIDE/AMINE TERMINATED POLY(OXYALKYLENE) REACTION PRODUCTS

TECHNICAL FIELD

This invention relates to combinations of surfactants and water-dispersible materials made by reacting at least one hydrocarbyl-substituted succinic acid and/or anhydride with at least one amine terminated poly(oxyalkylene), and to aqueous systems containing such combinations. The aqueous systems encompass both concentrates and water-based functional fluids, such as water-based lubricants, hydraulic fluids, cutting fluids and the like. The surfactant, water-dispersible hydrocarbyl-substituted succinic acid or anhydride/amine terminated poly(oxyalkylene) reaction product combinations are useful as thickeners for such aqueous systems; these combinations are stable under relatively high shear conditions.

BACKGROUND OF THE INVENTION

The term "water-based functional fluid" is used herein to refer to water-based lubricants, hydraulic fluids, cutting fluids and the like. Water-based functional fluids are not a new concept. However, in recent times, the increasing cost and scarcity of petroleum has made it increasingly desirable to replace oil-based functional fluids with water-based functional fluids wherever possible. Other benefits can also flow from such replacements such as decreased fire hazard and environmental pollution problems. In many cases, however, it is not feasible to make such replacements because the water-based functional fluids cannot be modified in their properties so as to perform to the same high degree as their oil-based counterparts. For example, it has been often difficult, if not impossible, to replace certain oil-based hydraulic fluids with water-based fluids even though the desirability of doing so is evident.

One of the problems in formulating suitable water-based functional fluids has been the selection of thickening agents that provide the desired degree of thickening and at the same time are stable under high shear conditions. Various thickeners have been tried, but none have been found to be entirely acceptable. Among the thickeners that have been tried are the polysaccharides, cellulose ethers and esters, and various synthetic polymers. The polysaccharides include the natural gums such as gum agar, guar gum, gum Arabic, algin, the dextrans, xanthan gum and the like. The cellulose ethers and esters include hydroxy hydrocarbyl cellulose and hydrocarbyl hydroxy cellulose and their salts. Included in this group are hydroxyethyl cellulose and the sodium salt of carboxy methyl cellulose. The synthetic polymers include polyacrylates, polyacrylamides, hydrolyzed vinyl esters, water-soluble homo- and interpolymers of acrylamidoalkane sulfonates containing at least 50 mole percent of acryloamido alkane sulfonate and other comonomers such as acrylonitrile, styrene and the like. Others include poly-n-vinyl pyrrolidones, homo- and copolymers as well as water-soluble salts of styrene, maleic anhydride and isobutylene maleic anhydride, copolymers.

It has been suggested to use certain water-soluble hydroxy terminated polyoxyalkylenes as thickening agents. See, for example, U.S. Pat. Nos. 3,005,776; 3,346,501; 4,138,346; and 4,151,099. The degree of thickening provided by these polyoxyalkylenes has not, however, been found to be entirely acceptable.

U.S. Pat No. 4,239,635 discloses carboxylic acid terminated diamides and alkali metal, ammonium or amine salts thereof which are derived from the reaction of organic polycarboxylic acids and polyoxyalkylene diamines. The reference indicates that these diamides have lubricating properties and are useful in aqueous metal working fluids.

U.S. Pat. No. 4,288,639 discloses the use of certain alpha-olefin oxide-modified polyoxyalkylenes as thickeners for aqueous liquids. This patent indicates that these thickeners are obtained by capping a liquid straight-chain polyoxyalkylene heteric or block copolymer intermediate with an alpha-olefin oxide.

There remains a need for water-dispersible thickening agents that can provide water-based functional fluids with desired levels of thickening and are sufficiently stable for high shear applications.

SUMMARY OF THE INVENTION

Water-dispersible combinations of surfactants and hydrocarbylsubstituted succinic acid and/or anhydride/amine terminated poly(oxyalkylene) reaction products are provided in accordance with the present invention. These combinations are useful as thickeners for water-based functional fluids, and are relatively stable for high shear applications.

Broadly stated, the present invention contemplates the provision of a composition comprising (A) at least one water-dispersible reaction product made by reacting (A)(I) at least one hydrocarbyl-substituted succinic acid and/or anhydride represented by the formula

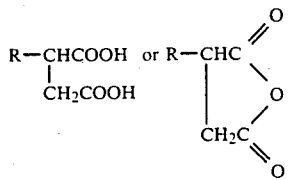

wherein R is a hydrocarbyl group of from about 8 to about 40 carbon atoms, with (A)(II) at least one water-dispersible amine terminated poly(oxyalkylene), and (B) at least one surfactant. Aqueous concentrates and water-based functional fluids comprising these compositions are also within the scope of the invention.

DESCRIPTION OF THE PREFERRED EMBODIMENT

The terms "dispersed" and "dissolved" (and cognate terms such as "dispersion", "dispersible", "solution", "soluble", etc.) are used throughout this specification and in the appended claims to refer to the distribution of the compositions of the invention in the aqueous systems to which they are added. While the practice of the present invention is not dependent on any particular theory or hypothesis to explain the invention, it should be understood that in some instances, the compositions of the invention may dissolve in the aqueous phase to form true solutions while in other instances, micelle dispersions or micro-emulsions may be formed which visibly appear to be true solutions. Whether a solution, micelle dispersion, or microemulsion is formed, is dependent on the particular composition employed and the particular system to which it is added. In any event, the terms "dispersed" and "dissolved" are used interchangeably throughout this specification and in the appended claims to refer to solutions, micelle dispersions, micro-emulsions and the like.

The term "water-dispersible" when referring to a material used in accordance with the invention refers to a material that forms a solution, micelle dispersion or micro-emulsion when added to water at a level of at least about one gram per liter at 25° C.

The term "hydrocarbyl" is used herein to include substantially hydrocarbyl groups (for example, substantially hydrocarbyloxy, substantially hydrocarbylmercapto, etc.), as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relative to their uses as described herein.

Examples of substituents which usually do not significantly alter the hydrocarbyl characteristics or properties of the general nature of the hydrocarbyl groups of this invention are the following:

Ether groups (especially hydrocarbyloxy such as methoxy, n-butoxy, etc.);
Oxo groups (e.e., —O— linkages in the main carbon chain);
Nitro groups;
Thioether groups;
Thia groups (e.g., —S— linkages in the main carbon chain);
Carbohydrocarbyloxy groups (e.g.,

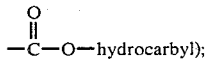

Sulfonyl groups (e.g.,

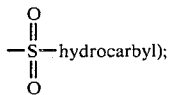

Sulfinyl groups (e.g.,

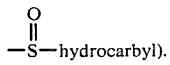

This list is intended to be merely illustrative and not exhaustive, and the omission of a certain class of substituent is not meant to require its exclusion. In general, if such substituents are present, there will not be more than two for each ten carbon atoms in the substantially hydrocarbyl group and preferably not more than one for each ten carbon atoms. Nevertheless, the hydrocarbyl groups are preferably free from non-hydrocarbon groups; that is, they are preferably purely hydrocarbyl groups consisting of only carbon and hydrogen atoms.

The term "substantially straight chain" is used herein to referto hydrocarbyl groups that have straight chains and contain no branching that adversely affects the thickening characteristics of the reaction products of components (A)(I) and (A)(II). For example, in the context of this invention, a straight chain $C_{16}$ alkyl group with a methyl group attached as a side or branch chain, and a straight chain $C_{16}$ alkyl group are substantially similar in their properties with regard to their use in this invention.

Component (A)(I)

The hydrocarbyl-substituted succinic acids and/or anhydrides (A)(I) used in making component (A) of the present invention are represented by the formula

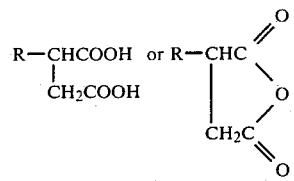

wherein R is a hydrocarbyl group of from about 8 to about 40 carbon atoms, preferably from about 8 to about 30 carbon atoms, more preferably from about 12 to about 24 carbon atoms, still more preferably from about 16 to about 18 carbon atoms. In a preferred embodiment, R is represented by the formula

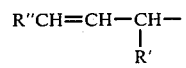

wherein R' and R" are independently hydrogen or straight chain or substantially straight chain hydrocarbyl groups, with the proviso that the total number of carbon atoms in R is within the above indicated ranges. Preferably R' and R" are alkyl or alkenyl groups. In a particularly advantageous embodiment, R has from about 16 to about 18 carbon atoms, R' is hydrogen or an alkyl group of from 1 to about 7 carbon atoms or an alkenyl group of from 2 to about 7 carbon atoms, and R" is an alkyl or alkenyl group of from about 5 to about 15 carbon atoms. Mixtures of two or more of these acids or anhydrides can be used.

The group R can be derived from one or more olefins of from about 8 to about 40 carbon atoms. These olefins are preferably alpha-olefins (sometimes referred to as molo-1-olefins) or isomerized alpha-olefins. Examples of the alpha-olefins that can be used include 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docesene, 1-tetracosene, 1-pentacosene, 1-hexacosene, 1-octacosene, 1-nonacosene, etc. Commercially available alpha-olefin fractions that can be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. The $C_{16}$ and $C_{16-18}$ alpha-olefins are particularly preferred. Procedures for the preparation of these alpha-olefins are well known to those skilled in the art and are described, for example, under the heading "Olefins" in the *Encyclopedia of Chemical Technology*, Second Edition, Kirk and Othmer, Supplement, pages 632–657, Interscience Publishers, Div. of John Wiley and Son, 1971, which is hereby incorporated by reference.

Isomerized alpha-olefins are alpha-olefins that have been converted to internal olefins (i.e., olefins wherein the olefinic unsaturation is other than in the "-1-" or alpha position). The isomerized alpha-olefins suitable for use herein are usually in the form of mixtures of internal olefins with some alpha-olefins present. The procedures for isomerizing alpha-olefins are well known in the art. Briefly these procedures usually involve contacting an alpha-olefin with a cation exchange resin at a temperature in the range of, for example, about 80° C. to about 130° C. until the desired degree of isomerization is achieved. These procedures are described, for examaple, in U.S. Pat. No. 4,108,889 and European Patent Application No. 20,037, which are incorporated herein by reference.

Generally, the hydrocarbyl-substituted succinic acids and anhydrides (A)(I) are prepared by reacting the above-described alpha-olefins or isomerized alpha-olefins with the desired unsaturated carboxylic acid such as fumaric acid or derivative thereof such as maleic anhydride at a temperature in the range of, for example, about 160° C. to about 240° C., preferably about 185° C. to about 210° C., and more preferably about 190° C. Generally these reactions are conducted at an atmospheric pressure, although pressures of up to about 100 psi can be used, particularly when the olefin has a relatively low molecular (e.g., $C_8$ to $C_{12}$). Free radical inhibitors (e.g., t-butyl catachol) can be used to reduce or prevent the formation of polymeric by-products. The procedures for preparing these hydrocarbyl-sustituted succinic acids and anhydrides are well known to those skilled in the art and have been described, for example, in U.S. Pat. No. 3,412,111; Japanese Kokai Tokkyo Koho Nos. 81 12,382 and 82 35,580; Benn et al, "The Ene Reaction of Maleic Anhydride With Alkenes", J. C. S. Perkin II, (1977), pp. 535-7; Remond, "Preparation-Properties et. Emplois de L'Anhydride Dodecenylsuccinique", *Revue Des Products Cliniques*, (Feb. 28, 1962) pp. 57-64, which are incorporated herein by reference.

Component (A)(II)

The water-dispersible amine terminated poly(oxyalkylene)s are preferably alpha omega diamino poly(oxyethylene)s, alpha omega diamino poly(oxypropylene) poly(oxyethylene) poly(oxypropylene)s or alpha omega diamino propylene oxide capped poly(oxyethylene)s. Component (A)(II) can also be a urea condensate of such alpha omega diamino poly(oxyethylene)s, alpha omega diamino poly(oxypropylene) poly(oxyethylene) poly(oxypropylene)s or alpha omega diamino propylene oxide capped poly(oxyethylene)s. Component (A)-(II) can also be a polyamino (e.g., triamino, tetramino, etc.) polyoxyalkylene provided it is amine terminated and it is water dispersible. In the compounds that contain both poly(oxyethylene) and poly(oxypropylene) groups, the poly(oxyethylene) groups preferably predominate to provide the desired water dispersibility. The terminal amines can be primary amines, e.g., $-NH_2$, or secondary amines, e.g., $-NHR^*$ wherein $R^*$ is a hydrocarbyl group of from 1 to about 18 carbon atoms, preferably from 1 to about 4 carbon atoms. $R^*$ is preferably an alkyl or an alkenyl group. These compounds generally have a number average molecular weight of at least about 2000, preferably in the range of about 2000 to about 30,000, more preferably in the range of about 2000 to about 10,000, more preferably in the range of about 3500 to about 6500. Mixtures of two or more of these compounds can be used.

In a preferred embodiment, component (A)(II) is a compound represented by the formula

wherein a is a number in the range of from zero to about 200; b is a number in the range of from about 10 to about 650; and c is a number in the range of from zero to about 200. These compounds preferably have number average molecular weights in the range of about 2000 to about 10,000, more preferably about 3500 to about 6500.

In another preferred embodiment, component (A)(II) is a compound represented by the formula

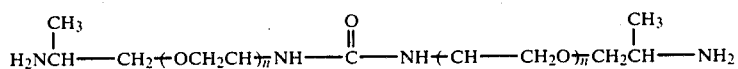

wherein n is a number sufficient to provide said compound with a number average molecular weight of at least about 2000. These compounds preferably have number average molecular weights in the range of about 2000 to about 10,000, more preferably about 3500 to about 6500.

Examples of water-dispersible amine-terminated poly(oxyalkylene)s that are useful in accordance with the present invention are disclosed in U.S. Pat. Nos. 3,021,232; 3,108,011; 4,444,566; and Re. 31,522. The disclosures of these patents are incorporated herein by reference.

Water-dispersible amine terminated poly(oxyalkylene)s that are useful are commercially available from the Texaco Chemical Company under the trade name Jeffamine.

Reaction of Components (A)(I) and (A)(II) to form Component (A)

The reaction of one or more of component (A)(I) with one or more of component (A)(II) to provide the water-dispersible reaction products (A) of the invention can be carried out at temperatures ranging from the highest of the melt temperatures of the reaction components up to the lowest of the decomposition temperatures of the reaction components or products. Generally, it is carried out at a temperature in the range of about 60° C. to about 160° C., preferably about 120° C. to about 160° C. Usually the reaction is carried out under amide-forming conditions and the product thus formed is, for example, a half-amide, i.e., an amide/acid.

Generally the ratio of equivalents of component (A)(I) to component (A)(II) ranges from about 0.1:1 to about 8:1, preferably about 1:1 to about 4:1, and advantageously about 2:1. The weight of an equivalent of component (A)(I) can be determined by dividing its molecular weight by the number of carboxylic functions present. With component (A)(I), the weight of an equivalent is equal to one-half of its molecular weight. The weight of an equivalent of the amine-terminated polyoxyalkylene (A)(II) can be determined by dividing its molecular weight by the number of terminal amine groups present. These can usually be determined from the structural formula of the amine terminated polyoxyalkylene or empirically through well known procedures.

The amide/acids formed by the reaction of components (A)(I) and (A)(II) can be neutralized with, for example, one or more alkali metals, one or more amines, or a mixture thereof, and thus converted to amide/salts. Additionally, if these amide/acids are added to concentrates or functional fluids containing alkali metals or amines, amide/salts usually form, in situ.

Among the alkali metals that can be used to neutralize these amide/acids and thus form such amide/salts are sodium, potassium and lithium. Suitable metal bases include the free metals and their oxides, hydroxides, alkoxides and basic salts. Examples are sodium hydroxide, sodium methoxide, sodium carbonate, potassium hydroxide, potassium carbonate, and the like. Generally the ratio of moles of alkali metal to equivalents of acid in the amide/acid is in the range of about 1:10 to about 2:1, preferably about 1:1. The weight of an equivalent of acid in these amide/acids can be determined by dividing the molecular weight of the amide/acid by the number of —COOH groups present. These can usually be determined from the structural formula of the amide/acid or empirically through well known titration procedures.

Among the amines that can be used to neutralize these amide/acids are the N-(hydroxyl-substituted hydrocarbyl) amines. These amines generally have one to about four, typically one to about two hydroxyl groups per molecule. These hydroxyl groups are each bonded to a hydrocarbyl group to form a hydroxyl-substituted hydrocarbyl group which, in turn, is bonded to the amine portion of the molecule. These N-(hydroxyl-substituted hydrocarbyl) amines can be monoamines or polyamines and they can have a total of up to about 40 carbon atoms; generally they have a total of up to about 20 carbon atoms. They can be monoamines containing but a single hydroxyl group. These amines can be primary, secondary or tertiary amines while the N-(hydroxyl-substituted hydrocarbyl) polyamines can have one or more of any of these types of amino groups. Mixtures of two or more of any of the aforedescribed amines can also be used.

Specific examples of the N-(hydroxyl-substituted hydrocarbyl) amines suitable for use in this invention are the N-(hydroxy-lower alkyl) amines and polyamines such as 2-hydroxyethylamine, 3-hydroxybutylamine, di-(2-hydroxyethyl) amine, tri-(2-hydroxyethyl) amine, di-(2-hydroxypropyl) amine, N,N,N'-tri-(2-hydroxyethyl) ethylenediamine, N,N,N',N'-tetra(2-hydroxyethyl) ethylenediamine, N-(2-hydroxyethyl) piperazine, N,N'-di-(3-hydroxypropyl) piperazine, N-(2-hydroxyethyl) morpholine, N-(2-hydroxyethyl)-2-morpholinone, N-(2-hydroxyethyl)-3-methyl-2-morpholinone, N-(2-hydroxypropyl)-6-methyl-2-morpholinone, N-(2-hydroxypropyl)-5-carbethoxy-2-piperidone, N-(2-hydroxypropyl)-5-carbethoxy-2-piperidone, N-(2-hydroxyethyl)-5-(N-butylcarbamyl)-2-piperidone, N-(2-hydroxyethyl) piperidine, N-(4-hydroxybutyl) piperidine, N,N-di-(2-hydroxyethyl) glycine, and ethers thereof with aliphatic alcohols, especially lower alkanols, N,N-di(3-hydroxypropyl)glycine, and the like.

Further amine alcohols are the hydroxy-substituted primary amines described in U.S. Pat. No. 3,576,743 by the general formula

wherein $R_a$ is a monovalent organic radical containing at least one alcoholic hydroxy group. According to this patent, the total number of carbon atoms in $R_a$ will not exceed about 20. Hydroxy-substituted aliphatic primary amines containing a total of up to about 10 carbon atoms are useful. Generally useful are the polyhydroxy-substituted alkanol primary amines wherein there is only one amino group present (i.e., a primary amino group) having one alkyl substituent containing up to 10 carbon atoms and up to 4 hydroxyl groups. These alkanol primary amines correspond to $R_aNH_2$ wherein $R_a$ is a mono- or polyhydroxy-substituted alkyl group. It is typical that at least one of the hydroxyl groups be a primary alcoholic hydroxyl group. Trismethylolaminomethane is a typical hydroxy-substituted primary amine. Specific examples of the hydroxy-substituted primary amines include 2-amino-1-butanol, 2-amino-2-methyl-1-propanol, p-(betahydroxyethyl)analine, 2-amino-1-propanol, 3-amino-1-propanol, 2-amino-2-methyl-1,3-propanediol, 2-amino-2-ethyl-1,3-propanediol, N-(betahydroxypropyl)-N'-(beta-aminoethyl) piperazine, 2-amino-1-butanol, ethanolamine, beta-(beta-hydroxy ethoxy)-ethyl amine, glucamine, glusoamine, 4-amino-3-hydroxy-3-methyl-1-butene (which can be prepared according to procedures known in the art by reacting isopreneoxide with ammonia), N-3-(aminopropropyl)-4(2-hydroxyethyl)-piperadine, 2-amino-6-methyl-6-heptanol, 5-amino-1-pentanol, N-beta-(hydroxyethyl)-1,3-diamino propane, 1,3-diamino-2-hydroxy-propane, N-(beta-hydroxy ethoxyethyl)-ethylenediamine, and the like. For further description of the hydroxy-substituted primary amines useful as the N-(hydroxyl-substituted hydrocarbyl)amines in this invention see U.S. Pat. No. 3,576,743 which is incorporated herein by reference.

Typically, the amine is a primary, secondary or tertiary alkanol amine or mixture thereof. Such amines can be represented, respectively, by the formulae:

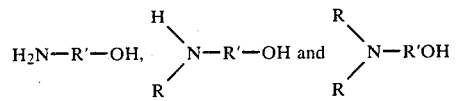

wherein each R is independently a hydrocarbyl group of 1 to about 8 carbon atoms or hydroxyl-substituted hydrocarbyl group of 2 to about 8 carbon atoms and R' is a divalent hydrocarbyl group of about 2 to about 18 carbon atoms. The group —R'—OH in such formulae represents the hydroxyl-substituted hydrocarbyl group. R' can be an acyclic, alicyclic or aromatic group. Typically, it is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)morpholines, -thiomorpholines, -piperidines, -oxazolidines, -thiazolidines and the like. Typically, however, each R is a lower alkyl group of up to 7 carbon atoms.

The amine can also be an ether N-(hydroxyl-substituted hydrocarbyl) amine. Such amines can be conveniently prepared by reaction of epoxides with aforedescribed amines and can be represented by the formulae:

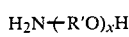

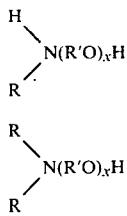

wherein x is a number from 2 to about 15 and R and R' are as described above.

Polyamine analogs of these alkanol amines, particularly alkoxylated alkylene polyamines (e.g., N,N-(diethanol)ethylene diamine) can also be used. Such polyamines can be made by reacting alkylene amines (e.g., ethylene diamine) with one or more alkylene oxides (e.g., ethylene oxide, octadecene oxide) of 2 to about 20 carbons. Similar alkylene oxide-alkanol amine reaction products can also be used such as the products made by reacting the aforedescribed primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino radicals or through hydroxy radicals are likewise useful. Condensation through amino radicals results in a higher amine accompanied by removal of ammonia while condensation through the hydroxy radicals results in products containing ether linkages accompanied by removal of water. Mixtures of two or more of any of the afore-described mono- or polyamines are also useful.

Generally the ratio of moles of amine to equivalents of amide/acid is in the range of about 1:10 to about 10:1, preferably about 1:1.

The alkali metal or amine is preferably added after the reaction between components (A)(I) and (A)(II) is completed, i.e., to the resulting amide/acid. Generally, the addition of alkali metal or amine is made at a temperature in the range of the highest of the melt temperatures of the amide/acid, or amine or metal base for the alkali metal up to the lowest of the decomposition temperatures of such materials. The temperature is preferably in the range of about 60° C. to about 160° C., more preferably about 120° C. to about 160° C.

The following examples describe exemplary preparations of water-dispersible hydrocarbyl-substituted succinic acid and/or anhydride/amine terminated polyoxyalkylene reaction products (A) of the present invention. Unless otherwise indicated, all parts and percentages are by weight, and all temperatures are in degrees centrigrade.

EXAMPLE 1

Part A 2960 parts of $C_{16}$ alpha-olefin and 100 parts of Amberlyst 15 (a product of Rohm & Haas Company identified as a cation exchange resin) are added to a five-liter flask equipped with a nitrogen sparge (2.0 standard cubic feet per hour), stirrer, thermowell and water trap positioned below a condenser. The mixture is heated to 120° C. for 1.5 hours with the stirrer operating at 350 rpm. The filtrate is the desired product.

Part B 367.5 parts of maleic anhydride are added to a two-liter flask equipped with stirrer, thermowell, reflux condenser and gas inlet tube. The maleic anhydride is melted and 765 parts of the product from Part A are added. The mixture is heated to 180°-200° C. for 9.75 hours. The mixture is stripped under a vacuum of 30 mm. Hg. at 182° C., then cooled to 115° C. The mixture is then stripped under a vacuum of 0.7 mm. Hg. at 145° C., then cooled to 50° C. The mixture is filtered with diatomaceous earth. The filtrate is the desired product.

EXAMPLE 2

Part A 1100 parts of a $C_{16-18}$ alpha-olefin fraction and 14 parts of Amberlyst 15 are added to a two-liter flask equipped with stirrer, thermowell, reflux condenser and stopper. The mixture is heated to 150°-155° C. for 3.25 hours, then filtered. The filtrate is the desired product.

Part B 412 parts of maleic anhydride and 920 parts of the product of Part A are added to a two-liter flask equipped with stirrer, thermowell, reflux condenser and stopper. The mixture is heated to 90° C. Stirring is commenced. The mixture is heated to 190°-195° C. with stirring and maintained at that temperature for 11.5 hours, then cooled to 80° C. The mixture is stripped under a vacuum of 38 mm. Hg. at a temperature of 120° C. The mixture is then stripped under a vacuum of 0.45 mm. Hg. at 180° C. The mixture is filtered with diatomaceous earth. The filtrate is the desired product.

EXAMPLE 3

5775 parts of a $C_{15-18}$ alpha-olefin fraction (having a carbon distribution of 1% $C_{14}$, 29% $C_{15}$, 28% $C_{16}$, 27% $C_{17}$, 14% $C_{18}$, and 1% $C_{19}$) are passed through a 12-inch column packed with activated alumina into a 12-liter flask containing maleic anhydride. The mixture is heated to 214° C. and maintained at that temperature for 7 hours with a nitrogen sparge (0.2 standard cubic feet per hour) and then cooled to room temperature. The mixture is then heated to 209°-212° C. and maintained at that temperature for 7 hours, then cooled to room temperature. 1500 parts of textile spirits are added and the mixture is stirred for one hour. The mixture is filtered with diatomaceous earth. The mixture is stripped under a vacuum of 30 mm. Hg. at 121° C., then cooled to room temperature. The mixture is then stripped under a vacuum of 0.7 mm. Hg. at 168° C. then cooled to room temperature. The mixture is filtered with diatomaceous earth at room temperature. The filtrate is the desired product.

EXAMPLE 4

A 20-liter kettle is purged with nitrogen. 475 parts of a $C_{18-24}$ alpha-olefin fraction are charged to the kettle. The kettle contents are heated to 71° C. and mixed. 189 parts maleic anhydride are added. The mixture is heated to 200° C. over a 6-hour period, the temperature increasing at a rate of 22° C. per hour. The mixture is then heated to 220° C. over a 4-hour period, the temperature increasing at a rate of 5° C. per hour. The temperature is maintained at 220° C. for 10 hours. The mixture is blown with nitrogen until the level of unreacted maleic anhydride is about 0.05% and then cooled to room temperature to provide the desired product.

EXAMPLE 5

100 parts of Jeffamine ED-4000 (a product of Texaco Chemical Co. identified as a diamine having an average molecular weight of about 4000 and being a primary amine terminated propylene oxide capped polyoxyethylene) and 16.3 parts of the product from Part B of Example 1 are mixed together, heated at a temperature of 130° C. for three hours, and then cooled to room temperature to provide the desired product.

EXAMPLE 6

100 parts of Jeffamine ED-6000 (a product of Texaco Chemical Co. identified as a diamine having an average molecular weight of about 6000 and being a primary amine terminated propylene oxide capped polyoxyethylene) and 10.8 parts of the product from Part B of Example 1 are mixed together, heated at a temperature of 130° C. for three hours, and then cooled to room temperature to provide the desired product.

EXAMPLE 7

20 parts of Jeffamine EDU-4000 (a product of Texaco Chemical Co. identified as a diamine having an average molecular weight of about 4000 made by coupling urea with a primary amine terminated propylene oxide capped polyoxyethylene) are melted at a temperature of 70° C. and mixed with 3.4 parts of the product from Part B of Example 2. The mixture is heated at a temperature of 121° C. for four hours and then cooled to room temperature to provide the desired product.

EXAMPLE 8

20 parts of Jeffamine EDU-4000 are melted at a temperature of 70° C. and mixed with 6.8 parts of the product from Part B of Example 2. The mixture is heated at a temperature of 121° C. for four hous and then cooled to room temperature to provide the desired product.

EXAMPLE 9

37.3 parts of Jeffamine ED-2001 (a product of Texaco Chemical Co. identified as a diamine having an average molecular weight of about 2000 and being a primary amine terminated propylene oxide capped polyoxyethylene) and 12.2 parts of the product from Part B of Example 2 are mixed together, heated at 105°–115° C. for 3–4 hours, then cooled to room temperature to provide the desired product.

Component (B)

The surfactants (B) that are useful can be of the cationic, anionic, nonionic or amphoteric type. Many such surfactants of each type are known to the art. See, for example, McCutcheon's "Emulsifiers & Detergents", 1981, North American Edition, published by McCutcheon Divison, MC Publishing Co., Glen Rock, N.J., U.S.A., which is hereby incorporated by reference for its disclosures in this regard.

Among the nonionic surfactant types are the alkylene oxide-treated products, such as ethylene oxide-treated phenols, alcohols, esters, amines and amides. Ethylene oxide/propylene oxide block copolymers are also useful nonionic surfactants. Glycerol esters and sugar esters are also known to be nonionic surfactants. A typical nonionic surfactant class useful with the present invention are the alkylene oxide-treated alkyl phenols such as the ethylene oxide alkyl phenol condensates sold by the Rohm & Haas Company. A specific example of these is Triton X-100 which contains an average of 9–10 ethylene oxide units per molecule, has an HLB value of about 13.5 and a molecular weight of about 628. Many other suitable nonionic surfactants are known; see, for example, the aforementioned McCutcheon's as well as the treatise "Non-ionic Surfactants" edited by Martin J. Schick, M. Dekker Co., New York, 1967, which is hereby incorporated by reference for its disclosures in this regard.

As noted above, cationic, anionic and amphoteric surfactants can also be used. Generally, these are all hydrophilic surfactants. Anionic surfactants contain negatively charged polar groups while cationic surfactants contain positively charged polar groups. Amphoteric dispersants contain both types of polar groups in the same molecule. A general survey of useful surfactants is found in Kirk-Othmer Encyclopedia of Chemical Technology, Second Edition, Volume 19, page 507 et seq. (1969, John Wiley and Son, New York) and the aforementioned compilation published under the name of McCutcheon's. These references are both hereby incorporated by reference for their disclosures relating to cationic, amphoteric and anionic surfactants.

Among the useful anionic surfactant types are the widely known carboxylate soaps, organo sulfates, sulfonates, sulfocarboxylic acids and their salts, and phosphates. Useful cationic surfactants include nitrogen compounds such as amine oxides and the well-known quaternary ammonium salts. Amphoteric surfactants include amino acid-type materials and similar types. Various cationic, anionic and amphoteric dispersants are available from the industry, particularly from such companies as Rohm & Haas and Union Carbide Corporation, both of American. Further information about anionic and cationic surfactants also can be found in the texts "Anionic Surfactants", Parts II and III, edited by W. M. Linfield, published by Marcel Dekker, Inc., New York, 1976 and "Cationic Surfactants", edited by E. Jungermann, Marcel Dekker, Inc., New York, 1976. Both of these references are incorporated by reference for their disclosures in this regard.

In a preferred embodiment the surfactant (B) is the condensation product of a primary amine with ethylene oxide such as those commercially available from Armak under the tradename Ethomeen.

In another preferred embodiment the surfactant (B) is a polyalkylene glycol ether such as the polyethylene glycol ethers of primary and secondary alcohols available from Union Carbide under the tradename Tergitol.

In still another preferred embodiment the surfactant (B) is a tall oil salt of an alkali metal or an amine.

In a particularly advantageous embodiment of the invention the surfactant (B) is at least one nitrogen-containing phosphorus-free reaction product made by reaction of (B)(I) at least one carboxylic acid acylating agent having at least one hydrocarbyl-based substituent of at least about 12 to about 500 carbon atoms with (B)(II) at least one (a) N-(hydroxyl-substituted hydrocarbyl)amine, (b) hydroxyl-substituted poly(hydrocarbyloxy) analog of said amine, or (c) mixtures of (a) and (b).

In general, the hydrocarbyl-based substituents present in the acylating agents (B)(I) are free from acetylenic unsaturation; ethylenic unsaturation, when present will generally be such that there is no more than one ethylenic linkage present for every ten carbon-to-carbon bonds in the substituent. The substituents are often completely saturated and therefore contain no ethylenic unsaturation.

The hydrocarbyl-based substituents present in the acylating agents (B)(I) may be derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group

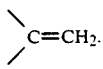

However, certain internal olefins can also serve as monomers (these are sometimes referred to as medial olefins). When such medial olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about two to about 16 carbon atoms. A more typical class of olefin polymers is selected from that group consisting of homo- and interpolymers of terminal olefins of two to six carbon atoms, especially those of two to four carbon atoms.

Specific examples of terminal and medial olefin monomers which can be used to prepare the olefin polymers from which the hydrocarbyl-based substituents of component (B)(I) are derived include ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene-1,2, butadiene-1,3, pentadiene-1,2, pentadiene-1,3, isoprene, hexadiene-1,5, 2-chlorobutadiene-1,3, 2-methylheptene-1,3 -cyclohexylbutene-1, 3,3-dimethylpentene-1, styrenedivinylbenzene, vinylacetate allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s such as obtained by polymerization of a C$_4$ refinery stream having a butene content of about 35 to about 75 percent by weight and an isobutene content of about 30 to about 60 percent by weight in the presence of a Lewis acid catalyst such as aluminum chloride or boron trifluoride. These polyisobutenes contain predominantly (that is, greater than 80% of the total repeat units) isobutene repeat units of the configuration

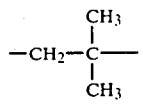

Typically, the hydrocarbyl-based substituent in the carboxylic acid acylating agent (B)(I) is a hydrocarbyl, alkyl or alkenyl group of about 12 to about 500 carbon atoms. Useful acylating agents include substituted succinic acid or anhydride containing hydrocarbyl-based substituents of about 20 to about 500 carbon atoms, more preferably about 30 to about 500 carbon atoms, more preferably about 50 to about 500 carbon atoms, more preferably about 50 to about 90 carbon atoms, and still more preferably about 60 to about 75 carbon atoms.

Often the agents (B)(I) used in making the surfactants (B) are substituted succinic acids or derivatives thereof which can be represented by the formula:

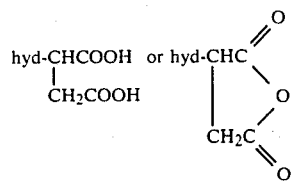

wherein "hyd" is the above-identified hydrocarbyl-based substituent. Such succinic acid acylating agents can be made by the reaction of maleic anhydride, maleic acid, or fumaric acid with the aforedescribed olefin polymer. Generally, the reaction involves merely heating the two reactants at a temperature of about 150° C. to about 200° C. Mixtures of the aforesaid polymeric olefins, as well as mixtures of unsaturated mono- and dicarboxylic acids can also be used.

The N-(hydroxyl-substituted hydrocarbyl)amines (B)(II) generally have one to about four, typically one to about two hydroxyl groups per molecule. These hydroxyl groups are each bonded to a hydrocarbyl group to form a hydroxyl-substituted hydrocarbyl group which, in turn, is bonded to the amine portion of the molecule. These N-(hydroxyl-substituted hydrocarbyl)amines can be monoamines or polyamines and they can have a total of up to about 40 carbon atoms; generally they have a total of up to about 20 carbon atoms. They can be monoamines containing but a single hydroxyl group. These amines can be primary, secondary or tertiary amines while the N-(hydroxyl-substituted hydrocarbyl)polyamines can have one or more of any of these types of amino groups. Mixtures of two or more of any of the aforedescribed amines can also be used.

Specific examples of the N-(hydroxyl-substituted hydrocarbyl)amines suitable for use in this invention are the N-(hydroxy-lower alkyl)amines and polyamines such as 2-hydroxyethylamine, 3-hydroxybutylamine, di-(2-hydroxyethyl)amine, tri-(2-hydroxyethyl)amine, di-(2-hydroxypropyl)amine, N,N,N'-tri-(2-hydroxyethyl)ethylenediamine, N,N,N',N'-tetra(2-hydroxyethyl)ethylenediamine, N-(2-hydroxyethyl)piperazine, N,N'-di-(3-hydroxypropyl)piperazine, N-(2-hydroxyethyl)morpholine, N-(2-hydroxy-ethyl)-2-morpholinone, N-

(2-hydroxyethyl)-3-methyl-2-morpholinone, N-(2-hydroxypropyl)-6-methyl-2-morpholinone, N-(2-hydroxypropyl)-5-carbethoxy-2-piperidone, N-(2-hydroxypropyl)-5-carbethoxy-2-piperidone, N-(2-hydroxyethyl)-5-(N-butylcarbamyl)-2-piperidone, N-(2-hydroxyethyl)piperidine, N-(4-hydroxybutyl)piperidine, N,N-di-(2-hydroxyethyl)glycine, and ethers thereof with aliphatic alcohols, especially lower alkanols, N,N-di(3-hydroxypropyl)glycine, and the like.

Further amine alcohols are the hydroxy-substituted primary amines described in U.S. Pat. No. 3,576,743 by the general formula $$R_a\text{—NH}_2$$

wherein $R_a$ is a monovalent organic radical containing at least one alcoholic hydroxy group. According to this patent, the total number of carbon atoms in $R_a$ will not exceed about 20. Hydroxy-substituted aliphatic primary amines containing a total of up to about 10 carbon atoms are useful. Generally useful are the polyhydroxy-substituted alkanol primary amines wherein there is only one amino group present (i.e., a primary amino group) having one alkyl substituent containing up to 10 carbon atoms and up to 4 hydroxyl groups. These alkanol primary amines correspond to $R_a\text{NH}_2$ wherein R is a mono- or polyhydroxy-substituted alkyl group. It is typical that at least one of the hydroxyl groups be a primary alcoholic hydroxyl group. Trismethylolaminomethane is a typical hydroxy-substituted primary amine. Specific examples of the hydroxy-substituted primary amines include 2-amino-1-butanol, 2-amino-2-methyl-1-propanol, p-(betahydroxyethyl)analine, 2-amino-1-propanol, 3-amino-1-propanol, 2-amino-2-methyl-1,3-propanediol, 2-amino-2-ethyl-1,3-propanediol, N-(betahydroxypropyl)-N'-(beta-aminoethyl)piperazine, 2-amino-1-butanol, ethanolamine, beta-(betahydroxy ethoxy)-ethyl amine, glucamine, glusoamine, 4-amino-3-hydroxy-3-methyl-1-butene (which can be prepared according to procedures known in the art by reacting isopreneoxide with ammonia), N-3-(aminopropyl)-4(2-hydroxyethyl)-piperadine, 2-amino-6-methyl-6-heptanol, 5-amino-1-pentanol, N-beta-(hydroxyethyl)-1,3-diamino propane, 1,3-diamino-2-hydroxy-propane, N-(beta-hydroxy ethoxyethyl)-ethylenediamine, and the like. For further description of the hydroxy-substituted primary amines useful as the N-(hydroxyl-substituted hydrocarbyl)amines in this invention see U.S. Pat. No. 3,576,743 which is incorporated herein by reference.

Typically, the amine (B)(II) is a primary, secondary or tertiary alkanol amine or mixture thereof. Such amines can be represented, respectively, by the formulae:

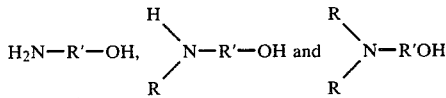

wherein each R is independently a hydrocarbyl group of 1 to about 8 carbon atoms or hydroxyl-substituted hydrocarbyl group of 2 to about 8 carbon atoms and R' is a divalent hydrocarbyl group of about 2 to about 18 carbon atoms. The group —R'—OH in such formulae represents the hydroxyl-substituted hydrocarbyl group. R' can be an acyclic, alicyclic or aromatic group. Typically, it is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to 7 carbon atoms.

The amine (B)(II) can also be an ether N-(hydroxyl-substituted hydrocarbyl)amine. Such amines can be conveniently prepared by reaction of epoxides with afore-described amines and can be represented by the formulae:

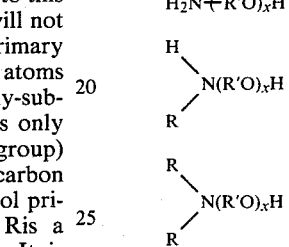

wherein x is a number from 2 to about 15 and R and R' are as described above.

Polyamine analogs of these alkanol amines, particularly alkoxylated alkylene polyamines (e.g., N,N-(diethanol)ethylene diamine) can also be used. Such polyamines can be made by reacting alkylene amines (e.g., ethylene diamine) with one or more alkylene oxides (e.g., ethylene oxide, octadecene oxide) of 2 to about 20 carbons. Similar alkylene oxide-alkanol amine reaction products can also be used such as the products made by reacting the aforedescribed primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl)-ethylene diamine, 1-(2-hydroxyethyl)piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino radicals or through hydroxy radicals are likewise useful. Condensation through amino radicals results in a higher amine accompanied by removal of ammonia while condensation through the hydroxy radicals results in products containing ether linkages accompanied by removal of water. Mixtures of two or more of any of the afore-described mono- or polyamines are also useful.

Particularly useful examples of N-(hydroxyl-substituted hydrocarbyl)amines (A)(II) include mono-, di-, and triethanol amine, diethylethanol amine, di-(3-hydroxyl propyl)amine, N-(3-hydroxyl butyl)amine, N-(4-hydroxyl butyl)amine, N,N-di-(2-hydroxyl propyl)amine, N-(2-hydroxyl ethyl)morpholine and its thio analog N-(2-hydroxyl ethyl)cyclohexyl amine, N-3-hydroxyl cyclopentyl amine, o-, m- and p-aminophenol, N-(hydroxyl ethyl)piperazine, N,N'-di(hydroxyl ethyl)- piperazine, and the like. Preferred amines are diethyl ethanol amine and ethanol amine and mixtures thereof.

The reaction of the acylating agent (B)(I) with the hydroxyl amine (B)(II) can be carried out at temperatures ranging from about 30° C. to the decomposition temperature of the reaction components and/or products having the lowest such temperature. Generally it is carried out at a temperature in the range of about 50° C. to about 150° C.; but usually at a temperature below about 100° C. Often the reaction is carried out under ester-forming conditions and the product thus formed is, for example, an ester, salt, amide, imide, amic ester or mixture of such products. The salt may be an internal salt, wherein one of the carboxyl groups becomes ionically bound to a nitrogen atom within the same group or it may be an external salt wherein the ionic salt group is formed with a nitrogen atom which is not part of the same group forming the ester group. Mixtures of acylating agents and/or mixtures of hydroxyl amines can be used.

Generally, the ratio of acylating agent (B)(I) to N-(hydroxyl-substituted hydrocarbyl)amine (B)(II) is in the range of about 0.5 to about 3 moles of amine (B)(II) per equivalent of acylating agent (B)(I). An equivalent of acylating agent (B)(I) can be determined by dividing its molecular weight by the number of carboxyl functions present. These can usually be determined from the structural formula of the acylating agent or empirically through well-known titration procedures. For example, a succinic acid anhydride or di(alkyl)ester acylating agent has an equivalent weight of one-half its molecular weight.

The reaction products made by the reaction of components (B)(I) and (B)(II) are disclosed in U.S. Pat. Nos. 4,329,249; 4,368,133; 4,435,297; 4,447,348; and 4,448,703. These patents are incorporated herein by reference.

EXAMPLE 10

To a charge of 1000 parts of a polyisobutene (Mn=950) substituted succinic anhydride heated in a resin kettle with stirring to about 90° C. is slowly added over a two hour period 209 parts of N,N-diethylethanol amine. Heating is continued for an additional hour at 90° C. The heated reaction mixture is cooled to room temperature to provide the desired product.

CONCENTRATES AND WATER-BASED FUNCTIONAL FLUIDS

Components (A) and (B) are generally provided in the compositions of the invention at weight ratios of (A):(B) in the range of about 1:5 to about 5:1, preferably about 1:1 to about 3:1. Mixtures of more than one of components (A) and/or (B) can be provided in such compositions. When such mixtures are provided for a component, the total amount of said component will generally still fall within the indicated weight ratios.

The invention includes aqueous systems or compositions characterized by an aqueous phase with components (A) and (B) dispersed in said aqueous phase. Preferably, this aqueous phase is a continuous aqueous phase. These aqueous systems usually contain at least about 30% by weight water. Such aqueous systems encompass both concentrates containing about 30% to about 90%, preferably about 50% to about 80% water; and water-based functional fluids containing a major amount of water and a minor thickening amount of the compositions of the invention, preferably from about 1.5% to about 10%, more preferably about 3% to about 6% by weight of said compositions. The concentrates preferably contain from about 10% to about 70% by weight of the compositions of the invention, more preferably from about 20% to about 50% by weight of said compositions. The concentrates generally contain less than about 50%, preferably less than about 25%, more preferably less than about 15%, and still more preferably less than about 6% hydrocarbon oil. The water-based functional fluids contain less than about 15%, preferably less than about 5%, and more preferably less than about 2% hydrocarbon oil. These concentrates and water-based functional fluids can optionally include other conventional additives commonly employed in water-based functional fluids. These other additives include functional additives, corrosion-inhibitors, shear stabilizing agents, bactericides, dyes, water-softeners, odor masking agents, anti-foam agents, and the like, as well as additional surfactants over and above those indicated as component (B).

The concentrates are analogous to the water-based functional fluids except that they contain less water and proportionately more of the other ingredients. The concentrates can be converted to water-based functional fluids by dilution with water. This dilution is usually done by standard mixing techniques. This is often a convenient procedure since the concentrate can be shipped to the point of use before additional water is added. Thus, the cost of shipping a substantial amount of the water in the final water-based functional fluid is saved. Only the water necessary to formulate the concentrate (which is determined primarily by ease of handling and convenience factors), need be shipped.

Generally these water-based functional fluids are made by diluting the concentrates with water, wherein the ratio of water to concentrate is usually in the range of about 80:20 to about 99:1 by weight. As can be seen when dilution is carried out within these ranges, the final water-based functional fluid contains, at most, an insignificant amount of hydrocarbon oil.

Also included within the invention are methods for preparing aqueous systems, including both concentrates and water-based functional fluids, containing other conventional additives commonly employed in water-based functional fluids. These methods comprise the steps of:

(1) mixing the composition of the invention with such other conventional additives either simultaneously or sequentially to form a dispersion or solution; optionally (2) combining said dispersion or solution with water to form said aqueous concentrate; and/or (3) diluting said dispersion or solution, or concentrate with water wherein the total amount of water used is in the amount required to provide the desired concentration of the composition of the invention and other functional additives in said concentrates or said water-based functional fluids.

These mixing steps are carried out using conventional equipment and generally at room or slightly elevated temperatures, usually below 100° C. and often below 50° C. As noted above, the concentrate can be formed and then shipped to the point of use where it is diluted with water to form the desired water-based functional fluid. In other instances the finished water-based functional fluid can be formed directly in the same equipment used to form the concentrate or the dispersion or solution.

The functional additives that can be used are typically oil-soluble, water-insoluble additives which function in conventional oil-based systems as E.P. agents, anti-wear agents, load-carrying agents, friction modifiers, lubricity agents, etc. They can also function as anti-slip agents, film formers and friction modifiers. As is well known, such additives can function in two or more of the above-mentioned ways; for example, E.P. agents often function as load-carrying agents.

The term "oil-soluble, water-insoluble functional additive" refers to a functional additive which is not soluble in water above a level of about 1 gram per 100 milliliters of water at 25° C., but is soluble in mineral oil to the extent of at least one gram per liter at 25° C.

These functional additives can also include certain solid lubricants such as graphaite, molybdenum disulfide and polytetrafluoroethylene and related solid polymers.

These functional additives can also include frictional polymer formers. Briefly, these are potential polymer forming materials which are dispersed in a liquid carrier at low concentration and which polymerize at rubbing or contacting surfaces to form protective polymeric films on the surfaces. The polymerizations are believed to result from the heat generated by the rubbing and, possibly, from catalytic and/or chemical action of the freshly exposed surface. A specific example of such materials is dilinoleic acid and ethylene glycol combinations which can form a polyester frictional polymer film. These materials are known to the art and descriptions of them are found, for example, in the journal "Wear", Volume 26, pages 369–392, and West German Published Patent Application No. 2,339,065. These disclosures are hereby incorporated by reference for their discussions of frictional polymer formers.

Typically these functional additives are known metal or amine salts of organo sulfur, phosphorus, boron or carboxylic acids which are the same as or of the same type as used in oil-based fluids. Typically such salts are of carboxylic acids of 1 to 22 carbon atoms including both aromatic and aliphatic acids; sulfur acids such as alkyl and aromatic sulfonic acids and the like; phosphorus acids such as phosphoric acid, phosphorus acid, phosphinic acid, acid phosphate esters and analogous sulfur homologs such as the thiophosphoric and dithiophosphoric acid and related acid esters; boron acids include boric acid, acid borates and the like. Useful functional additives also include metal dithiocarbamates such as molybdenum and antimony dithiocarbamates; as well as dibutyl tin sulfide, tributyl tin oxide, phosphates and phosphites; borate amine salts, chlorinated waxes; trialkyl tin oxide, molybdenum phosphates, and chlorinated waxes.

Many such functional additives are known to the art. For example, descriptions of additives useful in conventional oil-based systems and in the aqueous systems of this invention are found in "Advances in Petroleum Chemistry and Refining", Volume 8, Edited by John J. McKetta, Interscience Publishers, New York, 1963, pages 31–38 inclusive; Kirk-Othmer "Encyclopedia of Chemical Technology", Volume 12, Second Edition, Interscience Publishers, New York, 1967, page 575 et seq.; "Lubricant Additives" by M. W. Ranney, Noyes Data Corporation, Park Ridge, N.J., U.S.A., 1973; and "Lubricant Additives" by C. V. Smalheer and R. K. Smith, The Lezius-Hiles Co., Cleveland, Ohio, U.S.A. These references are hereby incorporated by reference for their disclosures of functional additives useful in the systems of this invention.

In certain of the typical aqueous systems of the invention, the functional addtive is a sulfur or chloro-sulfur E.P. agent, known to be useful in oil-base systems. Such materials include chlorinated aliphatic hydrocarbons, such as chlorinated wax; organic sulfides and polysulfides, such as benzyl-disulfide, bis-(chlorobenzyl)disulfide, dibutyl tetrasulfide, sulfurized sperm oil, sulfurized methyl ester of oleic acid, sulfurized alkylphenol, sulfurized dipentene, sulfurized terpene, and sulfurized Diels-Alder adducts; phosphosulfurized hydrocarbons, such as the reaction product of phosphorus sulfide with turpentine or methyl oleate; phosphorus esters such as the dihydrocarbon and trihydrocarbn phosphites, i.e., dibutyl phosphite, diheptyl phosphite, dicyclohexyl phosphite, pentylphenyl phosphite, dipentylphenyl phosphite, tridecyl phosphite, distearyl phosphite and polypropylene substituted phenol phosphite; metal thiocarbamates, such as zinc dioctyldithiocarbamate and barium heptylphenol dithiocarbamate; and Group II metal salts of phosphorodithioic acid, such as zinc dicyclohexyl phosphorodithioate, and the zinc salts of a phosphorodithioic acid.

The functional additive can also be a film former such as a synthetic or natural latex or emulsion thereof in water. Such latexes include natural rubber latexes and polystyrene butadienes synthetic latex.

The functional additive can also be anti-chatter or anti-squawk agents. Examples of the former are the amide metal dithiophosphate combinations such as disclosed in West German Pat. No. 1,109,302; amine salt-azomethene combinations such as disclosed in British Patent Specification No. 893,977; or amine dithiophosphate such as disclosed in U.S. Pat. No. 3,002,014. Examples of anti-squawk agents are N-acyl-sarcosines and derivatives thereof such as disclosed in U.S. Pat. Nos. 3,156,652 and 3,156,653; sulfurized fatty acids and esters thereof such as disclosed in U.S. Pat. Nos. 2,913,415 and 2,982,734; and esters of dimerized fatty acids such as disclosed in U.S. Pat. No. 3,039,967. The above-cited patents are incorporated herein by reference for their disclosure as pertinent to anti-chatter and anti-squawk agents useful as a functional additive in the aqueous systems of the present invention.

Specific examples of functional additives useful in the aqueous systems of this invention include the following commercially available products.

TABLE I

| Functional Additive Tradename | Chemical Description | Supplier |
|---|---|---|
| Anglamol 32 | Chlorosulfurized hydrocarbon | Lubrizol[1] |
| Anglamol 75 | Zinc dialkyl phosphate | Lubrizol[1] |
| Molyvan L | A thiaphosphomolybdate | Vanderbilt[2] |
| Lubrizol-5315 | Sulfurized cyclic carboxylate ester | Lubrizol[1] |
| Emcol TS 230 | Acid phosphate ester | Witco[3] |

[1]The Lubrizol Corporation, Wickliffe, Ohio, U.S.A.
[2]R. T. Vanderbilt Company, Inc., New York, N.Y., U.S.A.
[3]Witco Chemical Corp., Organics Division, Houston, Texas, U.S.A.

Mixtures of two or more of any of the aforedescribed functional additives can also be used.

Typically, a functionally effective amount of the functional additive is present in the aqueous systems of this invention. For example, if the functional additive is intended to serve primarily as a load-carrying agent, it is present in a load-carrying amount.

The aqueous systems of this invention often contain at least one inhibitor for corrosion of metals. These inhibitors can prevent corrosion of either ferrous or non-ferrous metals (e.g., copper, bronze, brass, titanium, aluminum and the like) or both. The inhibitor can be organic or inorganic in nature. Usually it is sufficiently soluble in water to provide a satisfactory inhibiting action though it can function as a corrosion inhibitor without dissolving in water, it need not be water-soluble. Many suitable inorganic inhibitors useful in the aqueous systems of the present invention are known to those skilled in the art. Included are those described in "Protective Coatings for Metals" by Burns and Bradley, Reinhold Publishing Corporation, Second Edition, Chapter 13, pages 596–605. This disclosure relative to inhibitors is incorporated herein by reference. Specific examples of useful inorganic inhibitors include alkali metal nitrites, sodium di- and tripolyphosphate, potassium and dipotassium phosphate, alkali metal borate and mixtures of the same. Many suitable organic inhibitors are known to those of skill in the art. Specific examples include hydrocarbyl amine and hydroxy-substituted hydrocarbyl amine neutralized acid compounds, such as neutralized phosphates and hydrocarbyl phosphate esters, neutralized fatty acids (e.g., those having about 8 to about 22 carbon atoms), neutralized aromatic carboxylic acids (e.g., 4-tertiarybutyl benzoic acid), neutralized naphthenic acids and neutralized hydrocarbyl sulfonates. Mixed salt esters of alkylated succinimides are also useful. Particularly useful amines include the alkanol amines such as ethanol amine, diethanol amine, triethanol amine and the corresponding propanol amines. Mixtures of two or more of any of the aforedescribed corrosion inhibitors can also be used. The corrosion inhibitor is usually present in concentrations in which they are effective in inhibiting corrosion of metals with which the aqueous composition comes in contact.

Certain of the aqueous systems of the present invention (particularly those that are used in cutting or shaping of metal) can also contain at least one polyol with inverse solubility in water. Such polyols are those that become less soluble as the temperature of the water increases. They thus can function as surface lubricity agents during cutting or working operations since, as the liquid is heated as a result of friction between a metal workpiece and worktool, the polyol or inverse solubility "plates out" on the surface of the workpiece, thus improving its lubricity characteristics.

The aqueous systems of the present invention can also include at least one bacteriocide. Such bactericides are well known to those of skill in the art and specific examples can be found in the aforementioned McCutcheon publication in the section entitled "Functional Materials" under the heading "Antimicrobials" on pages 9-20 thereof. This disclosure is hereby incorporated by reference as it relates to suitable bacteriocides for use in the aqueous compositions or systems of this invention. Generally, these bacteriocides are water-soluble, at least to the extent to allow them to function as bacteriocides.

The aqueous systems of the present invention can also include such other materials as dyes, e.g., an acid green dye; water softeners, e.g., ethylene diamine tetraacetate sodium salt or nitrilo triacetic acid; odor masking agents, e.g., citronella, oil of lemon, and the like; and anti-foamants, such as the well-known silicone anti-foamant agents.

The aqueous systems of this invention may also include an anti-freeze additive where it is desired to use the composition at a low temperature. Materials such as ethylene glycol and analogous polyoxyalkylene polyols can be used as anti-freeze agents. Clearly, the amount used will depend on the degree of anti-freeze protection desired and will be known to those of ordinary skill in the art.

As indicated above, the aqueous systems of the invention can contain additional surfactants over and above those indicated as component (B). These additional surfactants are useful in enhancing the dispersibility of the above indicated other additives, particularly the functional additives. Any one or more of the surfactants indicated above as component (B) can be used. These surfactants, when used, are generally employed in effective amounts to enhance the dispersion of the above-indicated additives in the aqueous systems of the invention.

It should also be noted that many of the ingredients described above for use in making the aqueous systems of this invention are industrial products which exhibit or confer more than one property on such aqueous systems. Thus, a single ingredient can provide several functions thereby eliminating or reduciang the need for some other additional ingredient. Thus, for example, an E.P. agent such as tributyl tin oxide can also function as a bacteriocide.

Illustrative water-base functional fluids within the scope of this invention are disclosed in Tables II–IV. Tables II and III also contain formulations not within the scope of the invention for purposes of comparison. These functional fluids are prepared by mixing the ingredients at a temperature in the range of about 50° C. to about 70° C. using conventional mixing techniques. The thickeners of the invention, (if present) are first mixed with the water and sodium hydroxide (if present). These ingredients are stirred for about one-half hour, and then the remaining ingredients are added. The numerical values indicated in Tables II–IV are in parts by weight.

In Table II formulations B–D are within the scope of the invention, while formulation A is outside the scope of the invention. That is, formulations B–D include both components (A) and (B), while formulation A includes only component (A). Although the product of Example 6 (i.e., component (A) is useful, in itself, as a thickener, the combinations provided in formulations B–D (i.e., component (A) plus one or more of component (B)) provide significantly enhanced thickening or higher viscosity over formulation A (i.e., component (A) only).

TABLE II

|  | A | B | C | D |
|---|---|---|---|---|
| Product of Example 6 | 3.5 | 3.5 | 3.5 | 3.5 |
| Product of Example 10 | — | 2.23 | — | — |
| Diluent oil | — | 0.17 | — | — |
| Unitol DT-40, a product of Union Camp, identified as distilled tall oil | — | 0.45 | — | — |
| Diethanolamine | — | 0.15 | — | — |
| Ethomeen T-15, commercial condensation product of primary amine with ethylene oxide from Armak | — | — | 3.0 | — |
| Tergitol 15-S-7, commercial polyethylene glycol ether of secondary alcohols from Union Carbide | — | — | — | 2.25 |
| Tergitol 15-S-12, commercial polyethylene glycol ether of secondary alcohols from Union Carbide | — | — | — | 0.75 |

TABLE II-continued

|  | A | B | C | D |
|---|---|---|---|---|
| 50% NaOH Aqueous Solution | 0.1 | 0.1 | 0.1 | 0.1 |
| Water | 96.4 | 93.4 | 93.4 | 93.4 |
| Viscosity at 50° C., cst. | 1.70 | 3.48 | 23.9 | 11.0 |

In Table III formulations E, G, I and K are within the include the surfactaants (i.e., component (B)). Formulations E and F are identical with the exception that formulation E contains the product of Example 6 and a correspondingly less amount of water; the kinematic viscosity at 50° C. for formulation E was 17.9 cst. while that for formulation F was only 1.0. Similar comparisons can be made between formulations G and H; I and J; and K and L.

TABLE III

|  | E | F | G | H | I | J | K | L |
|---|---|---|---|---|---|---|---|---|
| Product of Example 6 | 3.5 | — | 3.5 | — | 3.5 | — | 3.0 | — |
| Product of Example 10 | 2.17 | 2.17 | 2.92 | 2.92 | 1.69 | 1.69 | 2.41 | 2.41 |
| Diethanolamine | 0.143 | 0.143 | — | — | 0.11 | 0.11 | — | — |
| Diethylethanolamine | 0.59 | 0.59 | 0.59 | 0.59 | 0.41 | 0.41 | 0.59 | 0.59 |
| Ethanolamine | 0.33 | 0.33 | 0.33 | 0.33 | 0.36 | 0.36 | 0.39 | 0.39 |
| Unitol DT-40, a product of Union Camp, identified as distilled tall oil | 0.44 | 0.44 | — | — | 0.34 | 0.34 | — | — |
| Diluent oil | 0.17 | 0.17 | — | — | 0.72 | 0.72 | — | — |
| Grotan, a commercial bactericide available from Lehn & Fink, Div. of Sterling Drug | — | — | — | — | 0.16 | 0.16 | — | — |
| Zinc salt of 0,0-di(isooctyl) phosphorodithioic acid | 1.5 | 1.5 | 1.5 | 1.5 | 1.5 | 1.5 | 1.5 | 1.5 |
| Tergitol 15-S-7, commercial polyethylene glycol ether of secondary alcohols from Union Carbide | — | — | — | — | 0.92 | 0.92 | — | — |
| Tergitol 15-S-12, commercial polyethylene glycol ether of secondary alcohols from Union Carbide | — | — | — | — | 0.31 | 0.31 | — | — |
| Ethomeen T-15, commercial condensation product of primary amine with ethylene oxide from Armak | 1.17 | 1.17 | 1.17 | 1.17 | — | — | 1.17 | 1.17 |
| Unitol DSR-90, a product of Union Camp identified as a distilled tall oil | — | — | — | — | — | — | 0.46 | 0.46 |
| 50% NaOH Aqueous Solution | 0.1 | — | 0.1 | — | 0.1 | — | 0.1 | — |
| Water | 89.9 | 93.5 | 89.9 | 93.5 | 89.9 | 93.5 | 90.4 | 93.5 |
| Viscosity at 50° C., cst | 17.9 | 1.0 | 11.3 | 0.94 | 19.0 | 0.98 | 15.1 | 0.99 | scope of the invention, while formulations F, H, J and L are outside the scope of the invention. That is, formulations E, G, I and K include the product of Example 6 (i.e., component (A)) plus a number of surfactants (i.e., component (B)), while formulations F, H, J and L only include the surfactaants (i.e., component (B)). Formulations E and F are identical with the exception that formulation E contains the product of Example 6 and a correspondingly less amount of water; the kinematic viscosity at 50° C. for formulation E was 17.9 cst. while that for formulation F was only 1.0. Similar comparisons can be made between formulations G and H; I and J; and K and L.

In Table IV formulations M–U are disclosed which are a number of thickened water-based functional fluids which are within the scope of the invention and are useful as hydraulic fluids.

TABLE IV

|  | M | N | O | P | Q | R | S | T | U |
|---|---|---|---|---|---|---|---|---|---|
| Product of Example 5 | 4.8 | — | — | — | 4.5 | 3.5 | — | 6.0 | — |
| Product of Example 6 | — | 3.5 | 3.0 | 3.0 | — | — | — | — | 4.5 |
| Product of Example 7 | — | — | — | — | — | — | 6.0 | — | — |
| Product of Example 10 | 1.86 | 2.17 | 2.44 | 2.51 | 2.17 | 2.17 | 1.69 | 1.69 | 1.69 |
| Diethanolamine | 0.123 | 0.143 | 0.161 | 0.165 | 0.143 | 0.728 | 0.112 | 0.112 | 0.112 |
| Diethylethanolamine | 0.63 | 0.585 | 0.657 | 0.675 | 0.585 | — | 0.41 | 0.41 | 0.41 |
| Ethanolamine | 0.397 | 0.325 | 0.365 | 0.375 | 0.325 | 0.325 | 0.364 | 0.364 | 0.364 |
| Unitol DT-40, a product of Union Camp, identified as distilled tall oil | 0.378 | 0.442 | 0.496 | 0.510 | 0.442 | 0.442 | 0.343 | 0.343 | 0.343 |
| Diluent oil | 0.145 | 0.170 | 0.191 | 0.196 | 0.170 | 0.170 | 0.717 | 0.717 | 0.717 |
| Grotan, a commercial bactericide available from Lehn & Fink, Div. of Sterling Drug | — | — | — | — | — | — | 0.163 | 0.163 | 0.163 |
| Zinc salt of 0,0-di(isooctyl) phosphorodithioic acid | 1.625 | 1.495 | 1.679 | 1.725 | 1.495 | 1.495 | 1.482 | 1.482 | 1.482 |
| Tergitol 15-S-7, commercial polyethylene glycol ether of secondary alcohols from Union Carbide | 1.01 | — | — | — | — | — | 0.917 | 0.917 | 0.917 |
| Tergitol 15-S-12, commercial polyethylene glycol ether of secondary alcohols from Union Carbide | 0.34 | — | — | — | — | — | 0.31 | 0.31 | 0.31 |
| Ethomeen T-15, commercial condensation product of primary amine with ethylene oxide from Armak | — | 1.17 | 1.31 | 1.35 | 1.17 | 1.17 | — | — | — |

TABLE IV-continued

|  | M | N | O | P | Q | R | S | T | U |
|---|---|---|---|---|---|---|---|---|---|
| NACAP, sodium salt of mercaptobenzothiazole from R. T. Vanderbilt | 0.01 | 0.01 | 0.01 | 0.01 | 0.01 | 0.01 | — | — | 0.01 |
| 50% NaOH Aqueous Solution | 0.1 | 0.1 | 0.1 | 0.1 | 0.1 | 0.1 | 0.2 | 0.1 | 0.05 |
| Water | 88.6 | 89.9 | 89.6 | 89.4 | 89.9 | 89.9 | 87.3 | 87.4 | 88.94 |

Formulation O from Table IV is evaluated for shear stability using the Vickers Pump Testing Procedure (V-105C), the results being indicated in Table V. At various intervals during the pump test, formulation O is removed from the pump and tested for kinematic viscosity. The viscosity data is also included in Table V. The pump has a maximum pumping rate of 8 gal/min., a 10 horsepower motor, a V-105C Test Cartridge, a 60 mesh screen, and a four gallon sump using three gallons of fluid. The test procedure involves the steps of (1) weighing the cartridge and placing it in the pump, (2) increasing the torque head to 30 in-lbs. in 10 lb. increments, (3) formulation C is placed in the reservoir and the pump is started, (4) the head is reset at 30 in-lbs. and the pressure is adjusted to 200 psi as soon as positive flow is established, (5) the pump is run for 10 minutes at 200 psi, (6) the pressure is adjusted to 400 psi and the torque is increased to 75–80 in-lbs. in 10 in-lb. increments, (7) the pump is run for 10 minutes at 400 psi, (8) the pressure is adjusted to 600 psi and the pump is run for 10 minutes, (9) the pressure is adjusted to 800 psi and the flow rate is measured. The test is the run for a total of 870 hours, the test being interrupted at the indicated intervals to measure ring wear rate and viscosity.

TABLE V

| Time (hours) | Ring Wear Rate (mg./hr.) | Viscosity at 50° C. cst. | Pumping Rate (gal/min.) Start | Stop |
|---|---|---|---|---|
| 0 | — | 10.4 | 7.5 |  |
| 50 | 0.05 | 8.9 | 7.5 | 7.4 |
| 150 | 0.03 | 9.6 | 7.6 | 6.4 |
| 300 | 0.01 | 10.8 | 7.5 | 7.2 |
| 500 | 0.01 | 13.0 | 8.0 | 7.2 |
| 650 | 0.03 | 13.9 | 7.8 | 7.4 |
| 870 | 0.14 | 15.8 | — | 7.2 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising (A) at least one water-dispersible reaction product made by reacting (A) (I) at least one hydrocarbyl-substituted succinic acid and/or anhydride represented by the formula

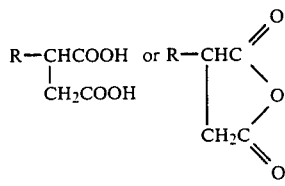

wherein R is a hydrocarbyl group of from about 8 to about 40 carbon atoms, with (A) (II) at least one water-dispersible amine terminated poly(oxyalkylene) having a number average molecular weight of at least about 2000, and (B) at least one surfactant.

2. The composition of claim 1 wherein R has from about 8 to about 30 carbon atoms.

3. The composition of claim 1 wherein R has from about 12 to about 24 carbon atoms.

4. The composition of claim 1 wherein R has from about 16 to about 18 carbon atoms.

5. The composition of claim 1 wherein R is an alkenyl group represented by the formula

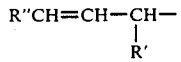

wherein R' and R" are independently hydrogen or straight chain or substantially straight chain hydrocarbyl groups.

6. The composition of claim 5 wherein R has from about 16 to about 18 carbon atoms, R' is hydrogen or an alkyl group of from 1 to about 7 carbon atoms or an alkenyl group of from 2 to about 7 carbon atoms, and R" is an alkyl or an alkenyl group of from about 5 to about 15 carbon atoms.

7. The composition of claim 1 wherein R is derived from an alpha-olefin or an isomerized alpha-olefin.

8. The composition of claim 1 wherein R is derived from a mixture of olefins.

9. The composition of claim 1 wherein said water-dispersible reaction product (A) is an amide/acid.

10. The composition of claim 1 wherein said water-dispersible reaction product (A) is an amide/salt.

11. The composition of claim 1 wherein component (A)(II) is an alpha omega diamino poly(oxyethylene), an alpha omega diamino poly(oxypropylene) poly(oxyethylene) poly(oxypropylene) or an alpha omega diamino propylene oxide capped poly(oxyethylene).

12. The composition of claim 1 wherein component (A)(II) is a urea condensate of an alpha omega diamino poly(oxyethylene), an alpha omega diamino poly(oxypropylene) poly(oxyethylene) poly(oxypropylene) or an alpha omega diamino propylene oxide capped poly(oxyethylene).

13. The composition of claim 1 wherein the terminal amines of component (A)(II) are represented by the formula —NH$_2$ or —NHR* wherein R* is a hydrocarbyl group of 1 to about 18 carbon atoms.

14. The composition of claim 13 wherein R* is a hydrocarbyl group of 1 to about 4 carbon atoms.

15. The composition of claim 1 wherein component (A)(II) is a compound represented by the formula

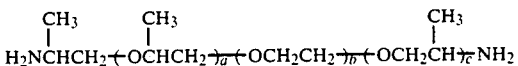

wherein a is a number in the range of from zero to about 200; b is a number in the range of from about 10 to about 650; and c is a number in the range of from zero to about 200.

16. The composition of claim 15 wherein b is a number in the range of about 50 to about 150.

17. The composition of claim 15 wherein the sum of a +c is about 2.5.

18. The composition of claim 1 wherein component (A)(II) is a compound represented by the formula

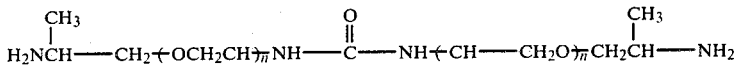

wherein n is a number sufficient to provide said compound with a number average molecular weight of at least about 2000.

19. The composition of claim 1 wherein the hydrocarbyl group is a substantially straight chain hydrocarbyl.

20. The composition of claim 1 wherein component (A)(II) has a number average molecular weight in the range of about 2000 to about 30,000.

21. The composition of claim 1 wherein component (A)(II) has a number average molecular weight in the range of about 2000 to about 10,000.

22. The composition of claim 1 wherein component (A)(II) has a number average molecular weight in the range of about 3500 to about 6500.

23. The composition of claim 1 wherein the ratio of equivalents of component (A)(I) to component (A)(II) ranges from about 0.1:1 to about 8:1.

24. The composition of claim 1 wherein the ratio of equivalents of component (A)(I) to component (A)(II) ranges from about 1:1 to about 4:1.

25. The composition of claim 1 wherein the ratio of equivalents of component (A)(I) to component (A)(II) is about 2:1.

26. The composition of claim 1 wherein components (A)(I) and (A)(II) are reacted at a temperature ranging from the highest of the melt temperatures of components (A)(I) and (A)(II) up to the lowest of the decomposition temperatures of such components of said reaction product.

27. The composition of claim 1 wherein components (A)(I) and (A)(II) are reacted at a temperature in the range of about 60° C. to about 160° C.

28. The composition of claim 1 wherein component (B) is an anionic, cationic, nonionic or amphoteric surfactant.

29. The composition of claim 1 wherein component (B) is a cationic or nonionic surfactant.

30. The composition of claim 1 wherein component (B) is a condensation product of a primary amine with ethylene oxide.

31. The composition of claim 1 wherein component (B) is a polyalkylene glycol ether.

32. The composition of claim 1 wherein component (B) is a polyethylene glycol ether of a primary or a secondary alcohol.

33. The composition of claim 1 wherein component (B) is tall oil salt.

34. The composition of claim 1 wherein component (B) is a nitrogen-containing, phosphorous-free reaction product of (B)(I) at least hydrocarbyl substituted carboxylic acylating agent, said hydrocarbyl substituent having from about 12 to about 500 carbon atoms, with (B)(II) at least one (a) N-(hydroxyl-substituted hydrocarbyl)amine, (b) hydroxyl-substituted poly(hydrocarbyloxy)analog of said amine or (c) mixtures of (a) and (b).

35. The composition of claim 34 wherein said acylating agent (B)(I) is represented by the formula:

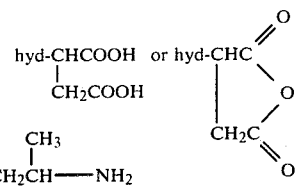

wherein hyd is said hydrocarbyl-based substituent of component (B)(I).

36. The composition of claim 34 wherein said hydrocarbyl-based substituent of component (B)(I) is an alkyl or an alkenyl group of about 12 to about 500 carbon atoms.

37. The composition of claim 34 wherein said hydrocarbyl-based substituent of component (B)(I) is a poly(isobutene) of about 12 to about 500 carbon atoms.

38. The composition of claim 34 wherein said amine (B)(II) has from 1 to about 4 hydroxyl groups per molecule bonded to a hydrocarbyl group, said hydrocarbyl group being bonded to the amine portion of the molecule.

39. The composition of claim 34 wherein said amine (B)(II) contains up to about 40 carbon atoms.

40. The composition of claim 34 wherein said amine (B)(II) is a primary, secondary or tertiary alkanol amine of up to about 40 carbon atoms.

41. The composition of claim 34 wherein said amine (B)(II) is a mixture of at least two alkanol amines of up to about 40 carbon atoms.

42. The composition of claim 34 wherein said amine (B)(II) is a hydroxy-substituted primary amine of the formula $$R_a-NH_2$$

wherein $R_a$ is a monovalent organic group containing at least one hydroxy group, the total number of carbon atoms in $R_a$ not exceeding about 20.

43. The composition of claim 42 wherein the total number of carbon atoms in $R_a$ does not exceed about 10.

44. The composition of claim 42 wherein $R_a$ contains up to about 4 hydroxyl groups.

45. The composition of claim 42 wherein $R_a$ is a monohydroxy-substituted alkyl group.

46. The composition of claim 34 wherein the amine (B)(II) is selected from the group consisting of (a) primary, secondary and tertiary alkanol amines which can be represented correspondingly by the formulae:

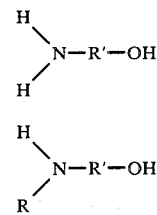

-continued

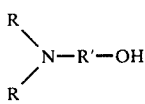

(b) hydroxyl-substituted oxyalkylene analogs of said alkanol amines represented by the formulae:

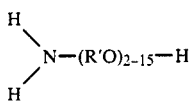

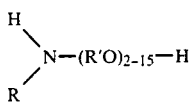

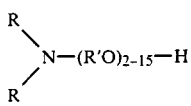

wherein each R is independently a hydrocarbyl group of one to about 8 carbon atoms or hydroxyl-substituted hydrocarbyl group of 2 to about 8 carbon atoms and R' is a divalent hydrocarbyl group of two to about 18 carbon atoms, and (c) mixtures of two or more thereof.

47. The composition of claim 34 wherein the amine (B)(II) is a mixture of diethylethanolamine and ethanolamine.

48. The composition of claim 34 wherein the amine (B)(II) is diethylethanolamine.

49. The composition of claim 1 wherein component (B) is a reaction product of a polyisobutenyl succinic anhydride with N,N-diethylethanolamine, the polyisobutenyl group of said polyisobutenyl substituted succinic anhydride containing an average of from about 50 to about 90 carbon atoms.

50. The composition of claim 49 wherein said polyisobutenyl group of said polyisobutenyl substituted succinic anhydride has an average of about 60 to about 75 carbon atoms.

51. The composition of claim 49 wherein the mole ratio of said polybutenyl succinic anhydride to said N,N-diethylethanolamine is about 1:2, said reaction product (B) being predominantly an ester/salt.

52. The composition of claim 1 wherein the weight ratio of (A) to (B) is in the range of about 1:5 to about 5:1.

53. The composition of claim 1 wherein the weight ratio of (A) to (B) is in the range of about 1:1 to about 3:1.

54. A concentrate comprising water and from about 10% to about 70% by weight of the composition of claim 1.

55. A water-based functional fluid comprising a major amount of water and a minor thickening amount of the composition of claim 1.

* * * * *